United States Patent
Li

(10) Patent No.: US 11,681,514 B2
(45) Date of Patent: Jun. 20, 2023

(54) MOUSE CHIP EASILY UPDATING FIRMWARE AND OPERATING METHOD THEREOF

(71) Applicant: PixArt Imaging Inc., Hsin-Chu County (TW)

(72) Inventor: Jr-Yi Li, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 186 days.

(21) Appl. No.: 17/136,480

(22) Filed: Dec. 29, 2020

(65) Prior Publication Data

US 2022/0206777 A1 Jun. 30, 2022

(51) Int. Cl.
*G06F 8/65* (2018.01)
*G06F 9/4401* (2018.01)

(52) U.S. Cl.
CPC .............. *G06F 8/65* (2013.01); *G06F 9/4411* (2013.01)

(58) Field of Classification Search
CPC .................................. G06F 8/65; G06F 8/654
See application file for complete search history.

(56) References Cited

U.S. PATENT DOCUMENTS

| | | | | |
|---|---|---|---|---|
| 9,940,123 | B1* | 4/2018 | Ayoub | G06F 13/4295 |
| 10,282,192 | B1* | 5/2019 | Ayoub | G06F 8/656 |
| 10,754,988 | B2* | 8/2020 | Tasher | G06F 21/602 |
| 2005/0144613 | A1* | 6/2005 | Tseng | G06F 8/65 |
| | | | | 717/168 |
| 2017/0123780 | A1* | 5/2017 | Albot | G06F 8/654 |

* cited by examiner

*Primary Examiner* — Duy Khuong T Nguyen
(74) *Attorney, Agent, or Firm* — Hauptman Ham, LLP

(57) ABSTRACT

There is provided a control chip including a microcontroller unit (MCU), a bus arbiter, a first bus, a second bus, a void hardware, a cache controller, a flash controller and a flash memory, wherein the flash memory is recorded with a firmware. When the MCU does not receive an update instruction, the bus arbiter reads, according to a function command of the MCU, a function return value associated with the function command from the flash memory via the first bus, the cache controller and the flash controller. When the MCU receives the update instruction, the bus arbiter updates the firmware in the flash memory via the second bus and the flash controller, and the void hardware actively replies a void return value associated with the function command to the MCU to replace the function return value.

18 Claims, 3 Drawing Sheets

MOUSE CHIP EASILY UPDATING FIRMWARE AND OPERATING METHOD THEREOF

BACKGROUND

1. Field of the Disclosure

This disclosure generally relates to a mouse device and, more particularly, to a mouse chip that needs not to stop the operation of all firmware in updating the firmware and an operating method thereof.

2. Description of the Related Art

It is known that the flash is operated by serial access. Because a microcontroller unit is operated by randomly accessing a memory in running a function call, the flash is not suitable to be used as the memory for the microcontroller unit to run the called function. If a cache can be used to read the flash, it is possible to realize the purpose of randomly accessing a flash.

The firmware embedded in an ASIC of a navigation device is mainly divided into two parts. One part of firmware is embedded in the ROM to execute navigation function of the navigation device, and the other part of firmware is recorded in the flash as a driver of functions other than the navigation function.

However, when the navigation device is being operated by a user, the operation of all firmware should be ceased if it is desired to update the firmware recorded in the flash, e.g., entering a so called programming mode, and the system needs to be rebooted after the update so as to finish the whole update procedure.

Accordingly, it is necessary to provide a mouse device that continuously performs the navigation function when the firmware in the flash is being updated and an operating method thereof.

SUMMARY

The present disclosure provides a control chip that adopts an additional hardware to directly reply a return value of a currently called function of the microcontroller unit (MCU) without reading a function return value of the called function from a flash when the firmware in the flash is being updated, and an operating method of the control chip.

The present disclosure further provides a control chip and an operating method thereof that read the function return value from a first bus and update the firmware in the flash via a second bus.

The present disclosure provides a mouse chip including a microcontroller, a bus arbiter, a flash memory, a cache controller and a flash controller. The microcontroller is configured to generate a function address of a function call. The bus arbiter is connected with the microcontroller, and configured to perform address mapping on the function address to generate an operation address to accordingly read a function return value from a first bus, or configured to receive update data from the microcontroller to be sent via a second bus. The flash memory is recorded with first firmware, and content of the flash memory is configured to operate a function called by the microcontroller to generate the function return value. The cache controller is connected with the first bus, and configured to cache the function return value generated in the flash memory into a cache memory according to the operation address. The flash controller, connected with the cache controller and the second bus, and configured to hold mapping between cache addresses and flash addresses to accordingly cache the function return value at a corresponding flash address of the operation address, or receive the update data via the second bus.

The present disclosure further provides an operating method of a mouse chip. The mouse chip includes a microcontroller, a bus arbiter, a first bus, a second bus, a cache controller, a flash controller and a flash memory. The operating method includes the steps of: generating, by the microcontroller, a function address of a function call; performing, by the bus arbiter, address mapping on the function address to generate an operation address, and sending the operation address to the cache controller via the first bus; caching, by the cache controller, a function return value generated by content at a corresponding flash address in the flash memory according to the operation address via the flash controller, and replying the function return value to the microcontroller via the first bus; and stopping reading the function return value by the bus arbiter via the first bus when the microcontroller is sending update data to the bus arbiter, and sending, by the bus arbiter, the update data to the flash controller via the second bus to update first firmware in the flash memory.

The present disclosure further provides a chip including a microcontroller, a flash memory, a flash controller, a cache controller, a bus arbiter and a void hardware. The microcontroller is configured to generate a function address of a function call. The flash memory is recorded with first firmware, and content of the flash memory is configured to operate a function called by the microcontroller to generate a function return value. The flash controller is configured to read and write the flash memory. The cache controller is configured to cache the function return value in the flash memory via the flash controller. The bus arbiter is connected with the microcontroller, and configured to read the function return value from the cache controller via the first bus, or update the first firmware in the flash memory via a second bus and the flash controller. The void hardware is configured to generate a void return value conforming to a format of the function return value of the function to the microcontroller to replace the function return value when the bus arbiter is updating the first firmware in the flash memory via the second bus and the flash controller.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The mouse device of the present disclosure communicates with an external host 90 via a USB interface or a Bluetooth interface. The USB interface provides power of the mouse device during operation, and transmits mouse movement data, control signals of mouse key click and mouse roller rotation as well as update data, which is used to update firmware recorded in a flash of the mouse device. The Bluetooth interface transmits mouse movement data, control signals of mouse key click and mouse roller rotation as well as update data. In order to realize randomly accessing the flash when the microcontroller unit (MCU) is executing a function call, the mouse device of the present disclosure adopts a structure of caching a flash by a cache controller.

Figure 1:
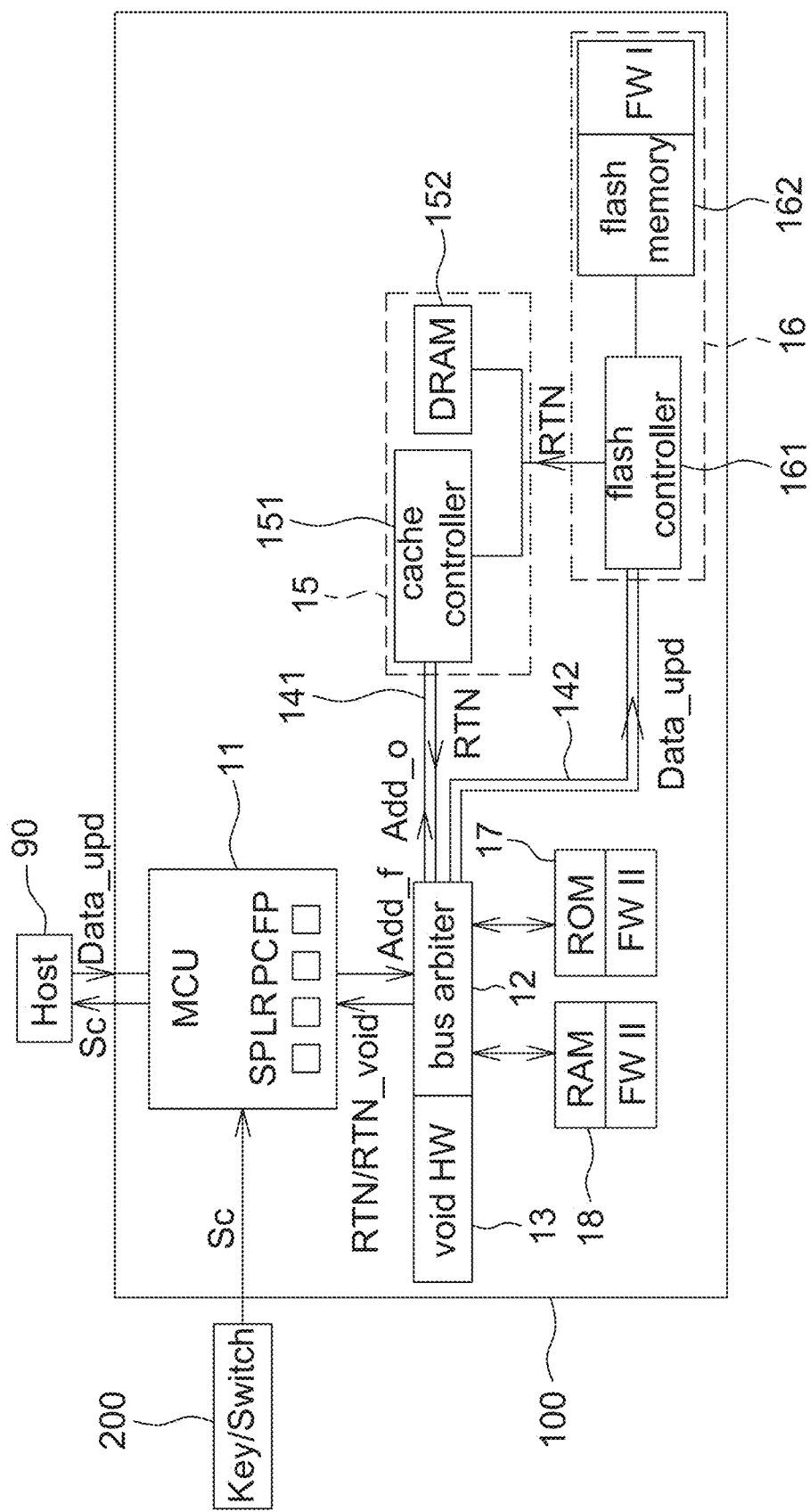
FIG. 1 is a schematic block diagram of a mouse device according to one embodiment of the present disclosure.

Please referring to FIG. 1, it is a schematic block diagram of a mouse device according to one embodiment of the present disclosure. The mouse device includes a mouse chip 100 and a key/switch 200, wherein the mouse chip 100 is arranged inside a mouse case and connected to an external host 90 via a USB interface or a Bluetooth interface. The operation of the USB interface and the Bluetooth interface is known to the art. The key/switch 200 is arranged on the mouse case to generate a control signal Sc to the mouse chip 100, e.g., generating a click signal or a switching signal as an update instruction.

In one aspect, the key/switch 200 is an exclusive element that is used to generate an update instruction (e.g., included in the control signal Sc shown in FIG. 1). After the mouse chip 100 receives the update instruction from the key/switch 200, the update instruction is sent to the host 90 to cause the host 90 to start to transmit update data Data_upd to the mouse chip 100. In another aspect, the update instruction is generated by the host 90 while executing predetermined software (APP). After sending the update instruction to the mouse chip 100, the host 90 then transmits update data Data_upd to the mouse chip 100 to update the firmware in a flash thereof. The update data Data_upd is, for example, download from internet or other storage devices.

The mouse chip 100 includes a microcontroller unit (or microcontroller) 11, a bus arbiter 12, a void hardware (shown as void HW) 13, a first bus 141, a second bus 142, a cache 15 and a flash 16, wherein the void hardware 13 is an additional hardware which is included in the bus arbiter 12 or is an independent hardware outside the bus arbiter 12. The void hardware 13 operates in a void mode, which is described by an example below. The cache 15 includes a cache controller 151 and a cache memory 152 (e.g., shown as DRAM, but not limited thereto). The flash 16 includes a flash controller 161 and a flash memory 162.

The flash memory 162 is recorded with first firmware (shown as FW I), which is used to control functions other than the navigation function, e.g., using as a driver of a third party's integrated circuit. In one aspect, if the mouse device of the present disclosure is a gaming mouse, the first firmware is used to control the lighting and/or flickering of multiple light emitting diodes (not for navigation function). For example, the first firmware is not embedded in the mouse device before shipment, but is installed or recorded as program codes in the flash 16 via an interface between the mouse device and the host 90 after shipment, but the present disclosure is not limited thereto.

The mouse device of the present disclosure further includes at least one of a read only memory (ROM) 17 and a random access memory (RAM) 18 connected to the bus arbiter 12, and the ROM 17 or the RAM 18 is embedded with second firmware (shown as FW II). In one aspect, the second firmware is used to calculate a mouse movement, and identify a mouse key click as well as a mouse roller rotation. For example, the second firmware is embedded in the application specific integrated circuit (ASIC) of the mouse device before shipment as one of basic control codes of the mouse device.

In the present disclosure, the mouse chip 100 is described by adopting an AMBA system, but the present disclosure is not limited thereto.

The MCU 11 is connected with the host 90 in a wired or wireless manner, and is used to transmit the control signal Sc to the host 90 and receive the update data Data_upd therefrom, wherein the update data Data_upd is used to update the first firmware in the flash memory 162. The control signal Sc includes, for example, a mouse movement data, signals of mouse key click and mouse roller rotation, as well as an update instruction (e.g., generated by the predetermined key/switch 200). During a function call, the MCU 11 generates a function address ADD_f of the function call, wherein the function address ADD_f has, for example, 32 bits.

The MCU 11 also accesses the ROM 17 and the RAM 18 and other peripherals using 32-bits addresses that are known to the art and not a main objective of the present disclosure, and thus details thereof are not described herein.

The MCU 11 further includes multiple registers, e.g., stack pointer (SP) register, link register (LR), program counter (PC) register and frame point (FP) register, wherein the LR is used to record, for example, a function return address of a function called by the MCU 11, and the PC register is used to record, for example, the function address ADD_f of the called function.

The mouse device of the present disclosure operates in a normal mode or a void mode depending on whether the MCU 11 receives an update instruction or not, from the key/switch 20 or the host 90.

The normal mode is a mode in which the MCU 11 normally reads a function return value RTN of a function called by the MCU 11 from the flash 16. In other words, content of the flash memory 162 is used to operate the function called by the MCU 11 to generate the function return value RTN, wherein the content herein is the program code of the first firmware or the program code instead of the first firmware.

The void mode is a mode in which the MCU 11 updates the first firmware in the flash memory 162 but does not read the function return value RTN from the flash 16. The void mode is entered after the MCU 11 receives the update instruction.

The bus arbiter 12 is connected with the MCU 11. In the normal mode, the bus arbiter 12 performs address mapping on the function address ADD_f to generate an operation address ADD_o, which is used to read the function return value RTN from the cache controller 151 via the first bus 141, wherein the operation address ADD_o is, for example, a content address (or sub-program address) in the flash memory 162 for executing the function called by the MCU 11.

The cache controller 151 is connected with the first bus 141. In the normal mode, the cache controller 151 caches, according to the operation address ADD_o, the function return value RTN generated in the flash memory 162 via the flash controller 161 into the cache memory 152 for being read by the bus arbiter 12. The bus arbiter 12 then replies the read function return value RTN to the MCU 11.

The flash controller 161 is connected with the cache controller 151 and the second bus 142, and used to read and write the flash memory 162. For example, the flash controller 161 holds the mapping between cache addresses (e.g., operation address ADD_o) and flash addresses such that when receiving the operation address ADD_o, the cache controller 151 caches the flash memory 162 based on the mapping, but the present disclosure is not limited thereto. It is possible that the flash controller 161 responds to the cache controller 151 by other ways to realize the random access on the flash 16 by the cache controller 151. In the normal mode, the cache controller 161 caches the function return value RTN generated by the content (or program) at a flash address in the flash memory 162 corresponding to the operation address ADD_o.

More specifically, when not receiving an update instruction, the MCU 11 operates in a normal mode, and the bus arbiter 12 reads the function return value RTN in the cache memory 162 via the first bus 161 for being replied to a function called by the MCU 11.

After receiving the update instruction, the MCU 11 enters a void mode (or called update mode). In the void mode, the bus arbiter 12 receives update data Data_upd from the MCU 11 and sends the update data Data_upd to the flash controller 161 via the second bus 142 (without passing the first bus 141) so as to update the first firmware in the flash memory 162 via the flash controller 161.

That is, in the normal mode, the bus arbiter 12 uses the first bus 141 to read the flash 16; whereas, in the void mode, the bus arbiter 12 uses the second bus 162 to write the flash 16.

Figure 2:
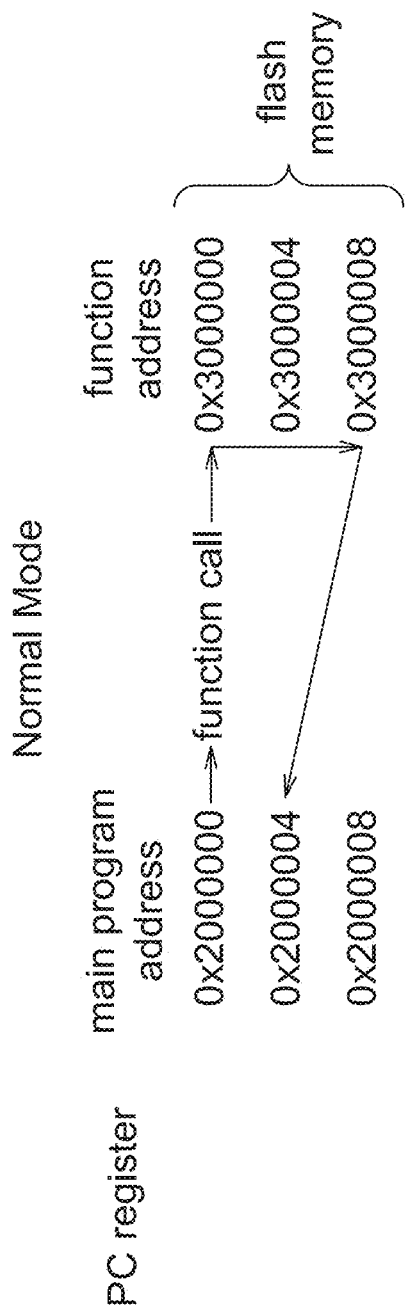
FIG. 2 is an operational schematic diagram of a mouse device operating in a normal mode according to one embodiment of the present disclosure.

For example referring to FIG. 2, in the normal mode, when a main program runs to an address 0x2000000 (e.g., recorded in PC register), a function is called. The function address of the called function is, for example, in the flash memory 162 such as 0x3000000 (e.g., an address of the program code in the flash memory 162 executing the function). After the function operation is accomplished (e.g., at an address 0x3000008) to obtain a function return value RTN, the PC register is directed to a next program address, e.g., shown as 0x2000004, which is recorded in LR register. The cache controller 151 returns the function return value RTN via the first bus 141 to the MCU 11.

Figure 3:
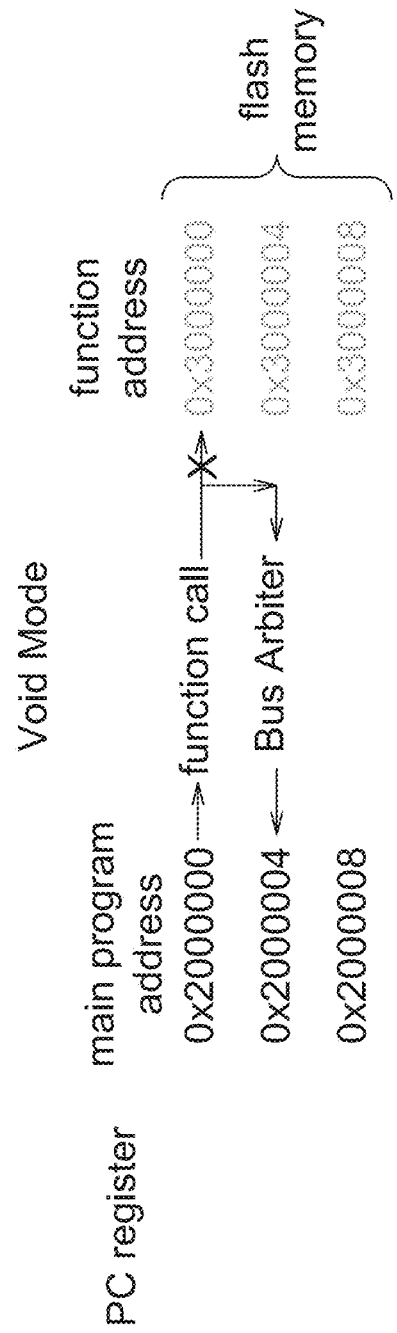
FIG. 3 is an operational schematic diagram of a mouse device operating in a void mode according to one embodiment of the present disclosure.

Please referring to FIG. 3, in the void mode, the bus arbiter 12 is to update the first firmware in the flash memory 162 via the second bus 142. Similarly, when the main program runs to the address 0x2000000 (e.g., recorded in PC register), a function is called. In this scenario, the bus arbiter 12 does not receive the function return value RTN via the first bus 141. However, as the MCU 11 still needs to receive a return value of the called function to cause the main program to continuously operate, the void hardware 13 generates and replies a void return value RTN void conforming to a format of the function return value RTN of the function called by the MCU 11 to replace the function return value RTN. Although the void return value RTN void leads to a wrong result of the main program run by the MCU 11, this wrong result does not influence the navigation function of the mouse device. Meanwhile, the void hardware 13 directly changes the function address in the PC register to a next program address (e.g., shown as 0x4000000), i.e. the function return address in the LR. In FIG. 3, the function addresses in the flash memory 162 is shown by a lighter color to indicate that they are not executed.

In the void mode, the bus arbiter 12 also changes values in the SP register, the LR, and the FP register to any proper value as long as those values do not direct the program operation to enter the flash memory 162.

More specifically, the mouse chip 100 of the present disclosure is further arranged with a void hardware 13 that automatically generates and replies a void return value RTN void conforming to a format of a function return value RTN of the function called by the MCU 11 to replace the function return value RTN when the bus arbiter 12 is updating the first firmware in the flash memory 162 via the second bus 142 and the flash controller 161 to allow the main program to continuously run. Accordingly, in the void mode, only the first firmware in the flash memory 162 is ceased and updated, but the second firmware in the ROM 17 and/or the RAM 18 is continuously running. That is, in updating the first firmware, the mouse device continuously calculates the mouse movement, and identifies the mouse key click as well as the mouse roller rotation.

It should be mentioned that FIGS. 2 and 3 show function addresses to describe the operation of each mode. Because the operation address and the function address are the mapping to each other and are directed to the same memory location, the operation address is not shown herein. In addition, the addresses shown in FIGS. 2 and 3 are only intended to illustrate but not to limit the present disclosure.

Figure 4:
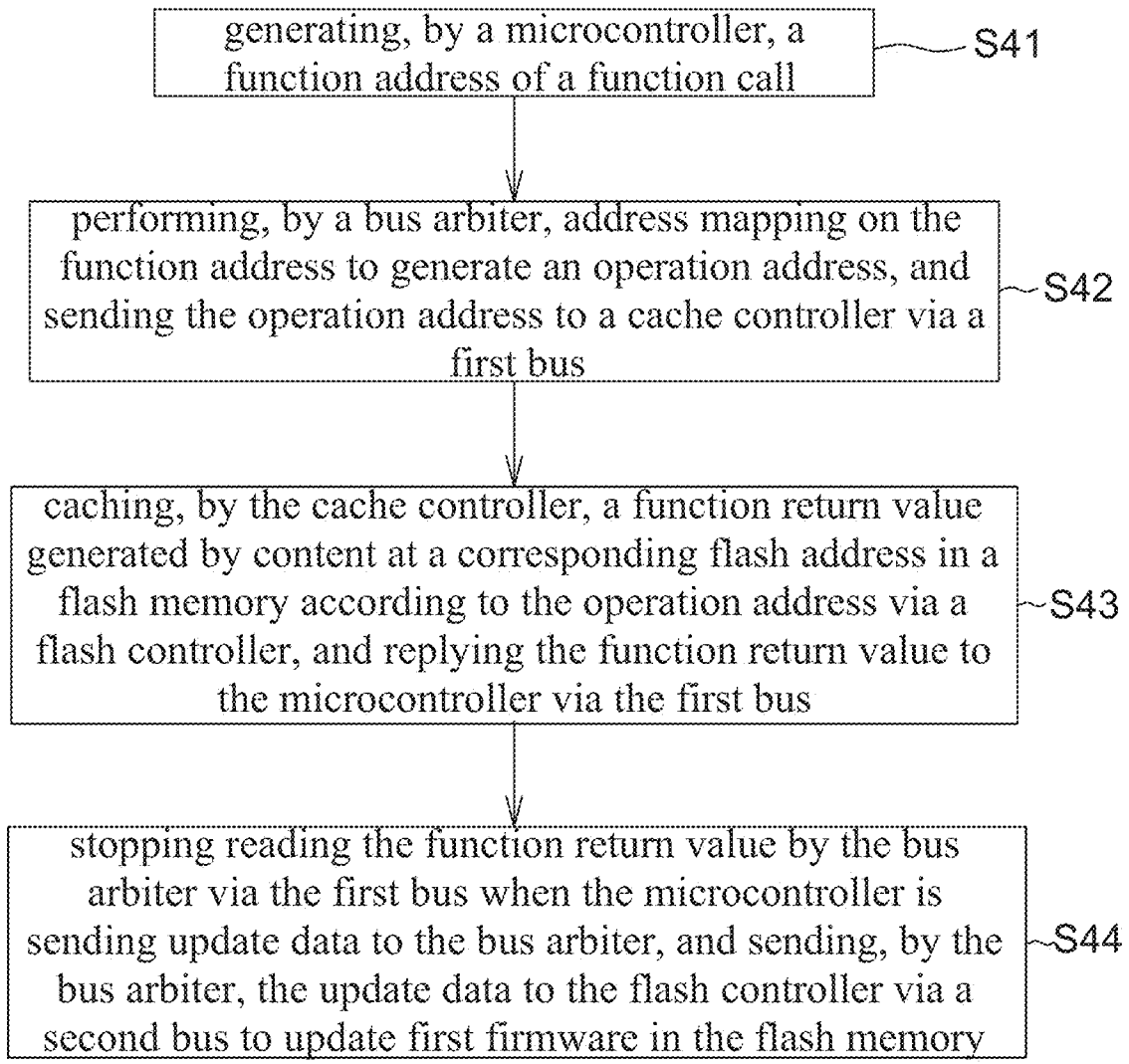
FIG. 4 is a flow chart of an operating method of a mouse device according to one embodiment of the present disclosure.

Please referring to FIG. 4, it is a flow chart of an operating method of a mouse device (or mouse chip) according to one embodiment of the present disclosure. The operating method is adapted to the mouse device in FIG. 1 and includes the steps of: generating, by a microcontroller 11, a function address ADD_f of a function call (Step S41); performing, by a bus arbiter 12, address mapping on the function address ADD_f to generate an operation address ADD_o, and sending the operation address ADD_o to a cache controller 151 via a first bus 141 (Step S42); caching, by the cache controller 151, a function return value RTN generated by content at a corresponding flash address in a flash memory 162 according to the operation address ADD_o via a flash controller 161, and replying the function return value RTN to the microcontroller 11 via the first bus 141 (Step S43); and stopping reading the function return value RTN by the bus arbiter 12 via the first bus 141 when the microcontroller 11 is sending update data Data_upd to the bus arbiter 12, and sending, by the bus arbiter 12, the update data Data_upd to the flash controller 161 via a second bus 142 to update first firmware in the flash memory 162 (Step S44).

Details of this operating method have been described above, and thus are not repeated herein. In the present disclosure, the bus arbiter 12 does not use the first bus 141 and the second arbiter 142 at the same time.

The flash cache structure of the present disclosure is not limited to be adapted to the mouse device but is also adaptable to the chip of other electronic devices that update the firmware in the flash during operation so as to improve the efficiency of updating the firmware.

Preferably, after updating the first firmware, the updated version of the first firmware continuously operates without rebooting the mouse device or the system. The updating process is started by pressing the key 200 or changing a position of the switch 200 on the mouse case.

As mentioned above, the operation of conventional mouse devices has to be stopped while updating the firmware in a flash thereof, and the mouse device or the system needs to be rebooted after the update. Accordingly, the present disclosure further provides a mouse chip that can maintains the operation of a part of firmware in updating the firmware in the flash thereof (e.g., FIG. 1) and an operating method thereof (e.g. FIG. 4) that is arranged with an additional hardware to actively replay a function return value and change addresses in the registers of the MCU when the firmware in the flash thereof is being updated.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A mouse chip, comprising:
a flash memory, recorded with first firmware, and content of the flash memory being configured to operate a function called by the mouse chip to generate a function return value, wherein
the mouse chip is configured to
generate a function address of a function call,
perform address mapping on the function address to generate an operation address,
cache the function return value generated in the flash memory into a cache memory according to the operation address, and
hold mapping between cache addresses and flash addresses to accordingly cache the function return value at a corresponding flash address of the operation address and read the function return value in the cache memory via a first bus, or update the first firmware in the flash memory with update data via a second bus.

2. The mouse chip as claimed in claim 1, wherein
upon not receiving an update instruction, the mouse chip is configured to read the function return value in the cache memory via the first bus, and
upon receiving the update instruction, the mouse chip is configured to send the update data via the second bus to update the first firmware in the flash memory.

3. The mouse chip as claimed in claim 2, wherein
upon receiving the update instruction, the mouse chip is further configured to generate and reply a void return value conforming to a format of the function return value of the function to replace the function return value.

4. The mouse chip as claimed in claim 3, wherein
the mouse chip further comprises multiple registers configured to record the function address and a function return address of the function, and
the mouse chip is further configured to change the function address and the function return address in the multiple registers upon receiving the update instruction.

5. The mouse chip as claimed in claim 4, wherein the multiple registers comprise a program counter register and a link register.

6. The mouse chip as claimed in claim 2, wherein the update instruction is generated by a mouse key or an external host.

7. The mouse chip as claimed in claim 1, further comprising at least one of a read only memory and a random access memory, wherein the read only memory or the random access memory is embedded with second firmware.

8. The mouse chip as claimed in claim 7, wherein
the first firmware is configured as a driver of a third party's integrated circuit, and
the second firmware is configured to calculate a mouse movement, and identify a mouse key click as well as a mouse roller rotation.

9. The mouse chip as claimed in claim 8, wherein upon sending the update data via the second bus, the second firmware continuously calculates the mouse movement, and identify the mouse key click as well as the mouse roller rotation.

10. An operating method of a mouse chip, the mouse chip comprising a microcontroller, a bus arbiter, a first bus, a second bus, a cache controller, a flash controller and a flash memory, the operating method comprising:
generating, by the microcontroller, a function address of a function call;
performing, by the bus arbiter, address mapping on the function address to generate an operation address, and sending the operation address to the cache controller via the first bus;
caching, by the cache controller, a function return value generated by content at a corresponding flash address in the flash memory according to the operation address via the flash controller, and replying the function return value to the microcontroller via the first bus; and
stopping reading the function return value by the bus arbiter via the first bus when the microcontroller is sending update data to the bus arbiter, and sending, by the bus arbiter, the update data to the flash controller via the second bus to update first firmware in the flash memory.

11. The operating method as claimed in claim 10, wherein the mouse chip further comprises a void hardware, and when the microcontroller is sending the update data to the bus arbiter, the operating method further comprises:
generating and replying, by the void hardware, a void return value conforming to a format of the function return value to the microcontroller to replace the function return value.

12. The operating method as claimed in claim 11, wherein the void hardware is included in the bus arbiter or is an independent hardware outside the bus arbiter.

13. The operating method as claimed in claim 11, wherein the microcontroller further comprises a register for recording the function address, and the operating method further comprises:
changing, by the void hardware, the function address in the register to a next program address.

14. The operating method as claimed in claim 10, wherein the mouse chip further comprises at least one of a read only memory and a random access memory connected to the bus arbiter, and the read only memory or the random access memory is embedded with second firmware, and the operating method further comprises:
calculating a mouse movement and identifying a mouse key click as well as a mouse roller rotation by the second firmware when the first firmware is being updated.

15. A chip, comprising:
a flash memory, recorded with first firmware, and content of the flash memory being configured to operate a function called by the chip to generate a function return value, wherein
the chip is configured to
generate a function address of a function call,
cache the function return value in the flash memory into a cache memory,
read the function return value from the cache memory via a first bus, or update the first firmware in the flash memory via a second bus, and
generate a void return value conforming to a format of the function return value of the function to replace the function return value when updating the first firmware in the flash memory via the second bus.

16. The chip as claimed in claim 15, wherein
the chip further comprises multiple registers configured to record the function address and a function return address of the function, and
the chip is further configured to change the function address and the function return address in the multiple registers when updating the first firmware in the flash memory via the second bus.

17. The chip as claimed in claim 15, further comprising at least one of a read only memory and a random access memory, wherein the read only memory or the random access memory is embedded with second firmware.

18. The chip as claimed in claim 17, wherein the second firmware is continuously operating when updating the first firmware in the flash memory via the second bus.

* * * * *